(12) United States Patent
Nachenberg et al.

(10) Patent No.: US 7,904,573 B1
(45) Date of Patent: *Mar. 8, 2011

(54) TEMPORAL ACCESS CONTROL FOR COMPUTER VIRUS PREVENTION

(75) Inventors: Carey S. Nachenberg, Northridge, CA (US); William E. Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 12/249,737

(22) Filed: Oct. 10, 2008

Related U.S. Application Data

(63) Continuation of application No. 10/264,721, filed on Oct. 4, 2002, now Pat. No. 7,483,993, which is a continuation-in-part of application No. 10/046,496, filed on Oct. 29, 2001.

(60) Provisional application No. 60/282,203, filed on Apr. 6, 2001.

(51) Int. Cl.
*G06F 15/16* (2006.01)
*G06F 12/14* (2006.01)
(52) U.S. Cl. .......................................... 709/229; 726/4
(58) Field of Classification Search ................. 709/229; 726/1–2, 22–25; 713/188
See application file for complete search history.

(56) References Cited

U.S. PATENT DOCUMENTS 6,898,715 B1 * 5/2005 Smithson et al. ............... 726/24
7,096,215 B2 * 8/2006 Bates et al. ......................... 1/1

* cited by examiner

*Primary Examiner* — Joseph E Avellino
*Assistant Examiner* — Chirag Patel
(74) *Attorney, Agent, or Firm* — Fenwick & West LLP

(57) ABSTRACT

An access control system (200) enables a computer network (1) to prevent execution of computer code that may contain computer viruses. An access control console (201) generates an access control message (260) including control parameters such as a time limit (255). Said time limit (255) is disseminated to computers (2, 3) on the network (1). Said computers (2, 3) use the time limit (255) to determine the executability of computer code. Access control system (200) also enables blocking data communications with suspicious or susceptible programs in network (1) during virus outbreaks.

20 Claims, 10 Drawing Sheets

TEMPORAL ACCESS CONTROL FOR COMPUTER VIRUS PREVENTION

RELATED APPLICATIONS

The present application is a continuation of commonly-owned U.S. patent application Ser. No. 10/264,721, entitled "Temporal Access Control For Computer Virus Prevention", filed on Oct. 4, 2002, which in turn is a continuation-in-part of commonly-owned U.S. patent application Ser. No. 10/046,496, entitled "Temporal Access Control System for Virus Outbreaks", filed on Oct. 29, 2001, which in turn claims the benefit of commonly-owned provisional U.S. Patent Application Ser. No. 60/282,203, entitled "Temporal Access Control System for Virus Outbreaks", filed on Apr. 6, 2001, the disclosures of which are incorporated herein by reference in their entireties.

TECHNICAL FIELD

This invention pertains to the field of computer virus prevention and protection, and in particular, to proactive access control of computer networks during computer virus outbreaks.

BACKGROUND ART

A computer virus, in the broad sense that the term is used in the present specification and claims, is any malicious computer program or code that has the potential to infect normal computer files or damage computer systems in any way. Computer viruses typically reside in executable computer code and are activated when the computer code is executed. For example, a computer virus may be buried in an .EXE or .COM file, a Java script file embedded in an email in HTML format, or a WORD macro template, etc. Some computer viruses replicate themselves to use up computer resources in computer hard drives or memories and thus cause the computer system to collapse. Some computer viruses reformat computer hard drives to destroy computer files. Some computer viruses do not copy themselves to other computer code, e.g., Trojan horse type viruses, but they allow a hacker in a remote computer to take control of an infected computer.

Nowadays computer viruses spread rapidly throughout computer networks. New viruses can contaminate hundreds of thousands of computers worldwide in a few hours or days and cause enormous damage. During the virus outbreak, enterprise computer networks are especially vulnerable to computer virus attack because most of them are constantly connected to a wide area network (WAN) to communicate with outside computers or networks. This provides computer viruses a fertile soil to invade the enterprise computer networks from any location within the WAN.

Current anti-virus technologies fall short of providing optimal protection for enterprise computer networks against computer virus attacks. Many individuals and organizations use reactive technologies, e.g., anti-virus scanning software, to scan computer files in their servers and/or client computers to detect computer viruses that are known and have been analyzed. The reactive anti-virus software often fails to catch or prevent new and unknown infections. Another anti-virus technology, behavior blocking anti-virus software, has the capability to detect new varieties of computer viruses by monitoring if a computer code acts in a virus-like manner, such as changing a file attribute from "read-only" to "write" before infecting the file. The drawback of such behavior blocking anti-virus software is its high rate of false virus alerts, because it has difficulty in distinguishing a computer virus from normal software, which sometimes acts in a virus-like way. For example, standard installation and upgrade routines may patch existing files in a manner similar to a computer virus. To reduce the false alerts, a network administrator may have to lower the sensitivity of the behavior-blocking software, which entails higher risk of virus infection during a computer virus outbreak.

While some solutions provide temporary solutions to address the short term effects of virus outbreaks, these solutions may be inadequate for routine protection against infection. For example, a number of systems may be infected before an administrator detects a virus outbreak. While methods exist for constantly checking for viruses, these methods are cumbersome, and can continue to apply unnecessary scrutiny to files that may no longer be suspicious. What is needed is a method for screening computer code that targets computer code during the period when it is most likely to be infected.

DISCLOSURE OF INVENTION

The present invention overcomes deficiencies and limitations of conventional anti-virus software by providing a computer network access control method, system and computer-readable medium to block computer virus invasion and to reduce damages caused to a computer network (1) with minimum intrusive effects on computer network operation.

In one embodiment, the present invention allows a system administrator or users to enter into an access control status mode to immediately cope with an imminent computer virus attack or to provide general virus prevention instructions. The system administrator or users sends an access control message (260) to computers (2, 3) on the computer network (1) to specify an access control rule. In particular, the access control message (260) includes a time limit (255). The time limit (255) is used by the access control module (203) on computers (2, 3) to manage the execution of computer code.

When a computer code is to be executed, a time stamp (when the code was first introduced to the computer) is looked up in a memory table (205). The time stamp is compared with a current time to determine how long the computer code has been on the computer (2,3). In one embodiment, if the computer code has been on the computer (2,3) longer than the time limit (255), the computer code is permitted to execute without any restrictions.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

The present invention provides an effective access control system for preventing a computer virus from harming computers and computer networks with minimal intrusive effect on the operation of the computer networks.

Figure 1:
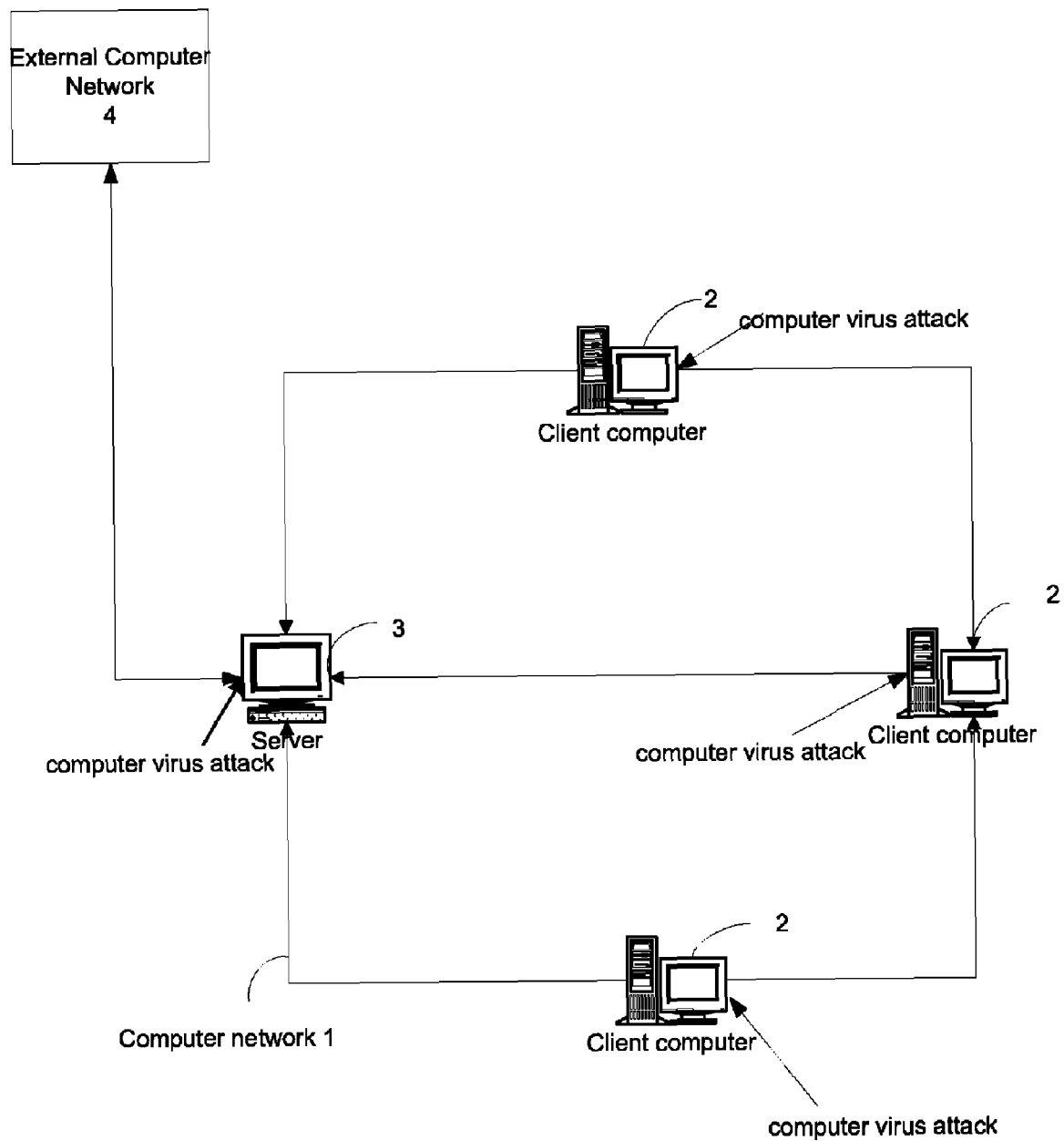
FIG. 1 is a block diagram of a computer network 1 in accordance with the present invention.

FIG. 1 illustrates a computer network 1 for which the present invention provides an advantageous access control method to prevent computer virus infection.

For purposes of illustration only, computer network 1 is a local area network (LAN) of the type that is widely used in an organization or an enterprise. Computer network 1 is typically operated in a server-client architecture. A server computer 3 is coupled to a plurality of client computers 2. Server 3 manages the operation of computer network 1, and each client computer 2 performs various functions according to the configuration of computer network 1. The group of client computers 2 may include workstations, file servers, or any other types of computing devices that can be coupled to computer network 1.

Computer network 1 is often vulnerable to various computer virus attacks. Computer network 1 is typically connected to an external network 4, which may be a WAN (Wide Area Network) or the WWW (World Wide Web component of the Internet). The constant network connection to external network 4 provides abundant opportunities for computer viruses to enter into computer network 1. For example, when server 3 or a client computer 2 receives E-mails, E-mail attachments may be embedded with a malicious worm. Another example is that a client computer 2 can be infected by downloading a computer file containing a computer virus from an outside FTP server.

Besides being infected by viruses spread from a network 4 connection, computers 2, 3 can also be infected by other ways. For example, a user comes back from a business trip with his mobile computer infected with a new computer virus. Not knowing about the infection, the user connects the mobile computer to computer network 1. As a result, the computer virus enters the network 1 and infects computers 2, 3 through interchanging computer files.

As mentioned above, conventional anti-virus software has certain limitations in detecting new varieties of computer viruses. When a new computer virus outbreak starts, computer network 1 is at high risk to be damaged even though anti-virus software is running on each computer 2, 3.

As a remedy, computer network 1 often imposes a strict network access control in order to filter out those incoming computer files that may contain potential malicious computer code. If computer network 1 is under imminent virus attack and the identities of the viruses are unknown, access for external network 4 may have to be completely shut down to suspend the inflow of data to enter into network 1.

Such access control measures often result in significant side effects while providing only very limited benefits without guaranteeing immunity from computer virus infection. As described above, even a temporary loss of computer network access impedes the normal use of the network 1.

To overcome the enormous intrusiveness caused by conventional access control, access control system 200 provided by the present invention shields computer network 1 from new computer virus attacks and allows computer network 1 to operate as in a normal condition.

Among other benefits, the present invention provides the following:

It prevents new viruses, worms and Trojan horses from entering computer network 1 during the computer virus outbreak;

Users on computer network 1 can still run virtually any program. Only new computer applications, including programs, scripts and macros, are blocked.

Even if computer 2, 3 has already been infected with a new virus, e.g., a worm, the present invention can preclude further infection of other computers 2, 3.

Figure 2A:
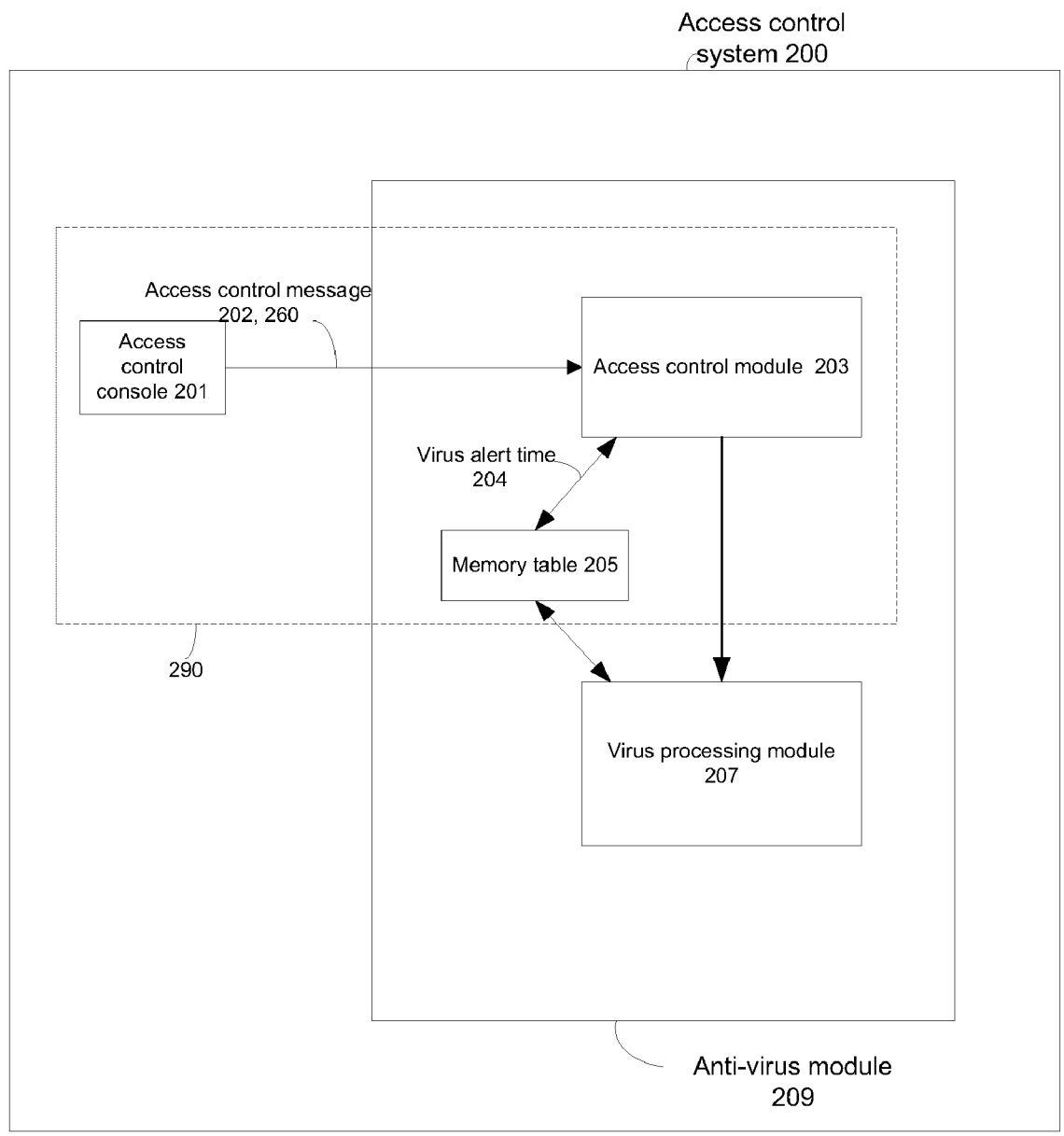
FIG. 2A is a diagram of an embodiment of computer access control system 200 of the present invention.

FIG. 2A is block diagram of an embodiment of access control system 200 in accordance with the present invention. Access control system 200 includes an access control console 201 and an anti-virus module 209. Anti-virus module 209 includes an access control module 203, a memory table 205, and a virus processing module 207. In one embodiment, access control console 201 is installed on server 3, and one anti-virus module 209 is installed on each computer 2, 3 coupled to network 1. The above referenced components 201-209 of access control system 200 can be implemented in hardware, software, and/or firmware.

In general, access control system 200 is capable of executing access control and anti-virus tasks for computer network 1. During the operation, access control system 200 may have two status modes, a safe status mode and a virus alert mode. If there is no virus outbreak report received, access control system 200 can be placed in the safe status mode. In this mode, less restrictive protective measures, such as access control messages 260 of the kind disclosed in FIG. 2C may be transmitted to the relevant computer systems 2,3. Additionally, the computer systems 2,3 may maintain their own internal virus prevention measures. When a new virus outbreak starts, the system administrator of computer network 1 may immediately place access control system 200 into the alert mode. Upon entering into the alert mode, access control system 200 will perform pre-configured access control measures and anti-virus checking to prevent execution of any susceptible or suspicious computer codes while ensuring normal programs execute as usual. Access control system 200 will also be capable of adapting to different stages of a virus outbreak and provide a granularity of protection levels according to urgencies and possibilities of virus infection.

In one embodiment, when entering an alert mode, the system administrator of network 1 uses access control console 201 to send access control message 202 to access control module 203 on computers 2, 3. Access control message 202 acts to deliver a specific access control rule to dictate what should be done by computers 2, 3 to prevent them from executing computer codes that may contain a virus. The system administrator can send multiple access control messages 202 to computers 2, 3 to exercise a plurality of protection levels based on actual access control needs.

In one embodiment, access control console 201 contains a high alert on-off toggle switch. The toggle switch is used to immediately increase the virus security of all managed computers 2, 3, by means of entering access control message 202, including various control parameters as described below and access control rules. Implementation of the on-off switch (in a console such as Openview, Unicenter, or Symantec's Management Console) and policy/software distribution are commonly known technologies.

Figure 2B:
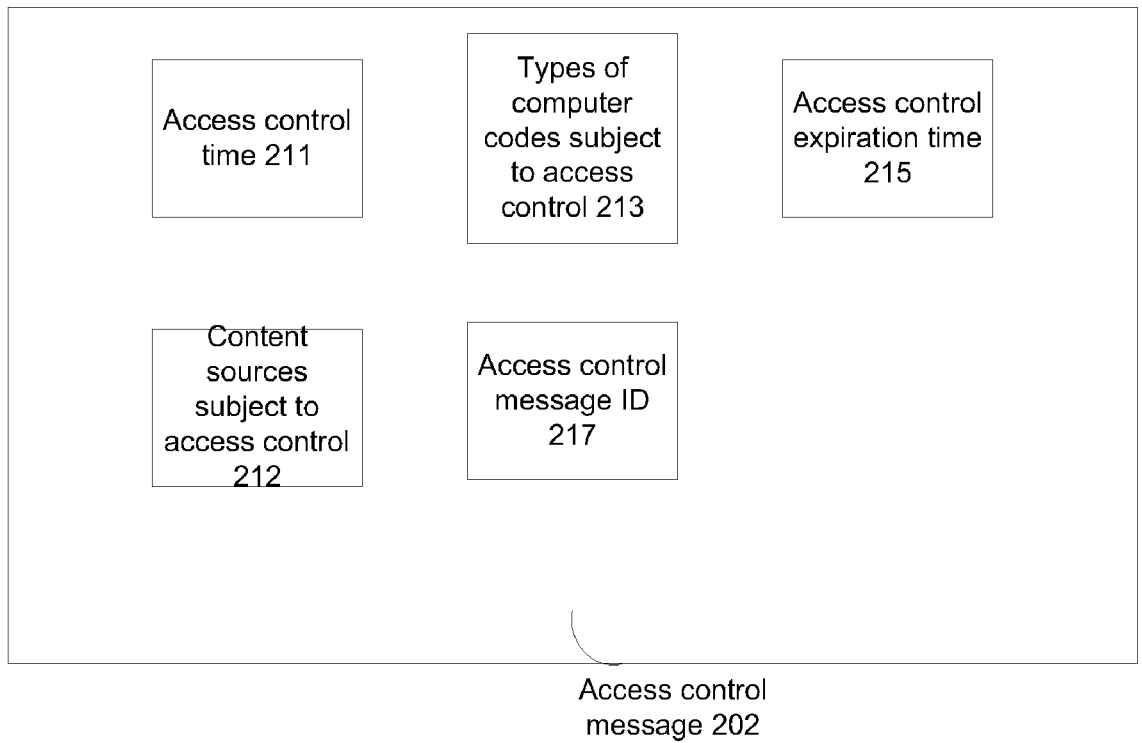
FIG. 2B is block diagram of an embodiment of access control message 202 used in computer access control system 200.

FIG. 2B illustrates an embodiment of access control message 202. Access control message 202 includes four control parameters, access control time 211, types of computer codes that should be subject to access control 213, content sources that should be subject to control 212, and access control expiration time 215. In addition, access control message 202 may include a unique identification number 217. The identification number 217 can be used by access control module 203 to process multiple control messages 202 during different stages of a virus outbreak.

In one embodiment, access control time 211 preferably corresponds to a period of time during which an undetected virus attack might occur to network 1. Access control time 211 can be used by access control module 209 to compare with a time stamp of a particular executable computer code in order to determine whether it is allowed to execute. As will be described in detail below, one embodiment of the present invention time-stamps executable computer codes while access control system 200 is running. The time stamp of an executable computer code corresponds to an earliest moment this particular computer code was allowed to execute by computers 2, 3. If such time stamp falls within the period of time as indicated by access control time 211, the computer code might be infected by an undetected virus. Thus, according to the present invention, access control message 202 will instruct computers 2, 3 to deny access to the computer code to avoid the virus attack. The use of access control time 211 advantageously enables computers 2, 3 to prohibit execution of computer files having computer viruses without affecting the execution of normal computer programs under most circumstances.

The use of access control time 211 also enables a multi-level access control method for network 1. The system administrator can send a new control message 202 having a revised access control time 211 based on the actual situation of the virus outbreak. For example, when the exact time of an early possible virus attack is unknown, the system administrator can apply a very stringent access control time 211, e.g., 7 days, to gain maximum safety. As more information about the virus outbreak is received, e.g., it is determined that a possible virus attack occurred 2 days ago at the earliest, the system administrator can send a new access control message 202, containing a new access control time 211 (2 days) to computers 2, 3, dictating computers 2, 3 to block the execution of all the computer codes that are time stamped within the previous 2 days.

The control parameter 213 is provided to dictate what kinds of computer codes should be subject to access control. For example, the system administrator may command that all of the executable computer codes should not be executed at the early stage of a virus outbreak; after knowing that the new breed of virus is not .EXE, nor .COM files, the system administrator can send a new control message 202 to change the parameter 213 to exclude .EXE and .COM computer codes from access control. As a result, any .EXE and .COM files will become accessible by users on network 1 in an alert mode.

The control parameter 212 is provided to dictate those sources from which content will be scrutinized. External content can be introduced into a system from external media drives, portable media such as CD-ROMs, local network sources, and Internet sources. In one embodiment, the system administrator can send a control message 202 to exclude content received from local media. In this embodiment, access control module 203 determines the source of executable content by noting the application that introduces the content to the system. If the content is introduced by an Internet application such as iexplore.exe, it is marked as having entered from the Internet. The source information is preferably stored in association with the content in memory table 205.

Control parameters in access control message 213, such as access control time 211, content sources 212, and types of computer codes 213, can be used separately or combined together. The present invention does not require that both control parameters 211, 233 must be present in a control message 202 in order to perform access control for network 1. Different configurations of the two parameters in access control message 202 can correspond to a granularity of access control levels. For example, one message 202 may command that all the .EXE files, WORD macros and java scripts (parameter 213) that are time stamped within 15 hours (parameter 211) should be blocked; another message 202, intended for adjusting the access control to a less stringent level may dictate to computers 2, 3 that only Java scripts (parameter 213) that are time stamped within the past 8 hours (parameter 211) should be blocked. By doing so, access control system 200 dynamically copes with an ongoing virus outbreak and reduces the intrusiveness to network 1 caused by access control to a minimum degree.

Note that while the system administrator sends multiple access control messages 202 to access control module 203, a subsequent control message 202 may automatically revoke previous control message 202. In an alternative embodiment, the system administrator may define an additional control parameter (access control expiration time 215) in control message 202 to specify when this access control message 202 ceases to operate in case no subsequent access control message 202 is received. An exemplary control message 202 may read as follows: "all the macros and .COM computer codes that are time stamped within 10 hours of entering the alert mode should be blocked from execution; and this access control message ceases to be effective in 2 days." In this example, expiration time 215 ("2 days") is combined together with access control time 211 and/or types of computer codes 213 to constitute control message 202. As will be further described below, access control module 203 will check the parameter 215 to determine if a particular control message 202 is still valid before it uses the message 202 for imposing access control rules.

Now returning to FIG. 2A, anti-virus module 209, running on computers 2, 3, receives access control message 202, which may include access control time 211, type of computer codes 213, content sources 212, expiration time 215 and access control message identification number 217, from access control console 201. Anti-virus module 209 performs appropriate actions based on the specified rule and parameters in message 202. In particular, access control module 203, memory table 205 and virus processing module 207 operate together to determine the executability of computer code during a computer virus outbreak.

Access control module 203 is operative to process control message 202 that is received from access control console 201. Access control module 203 is capable of analyzing access control message 202 and processing control parameters contained in control message 202. When an executable computer code on computers 2, 3 is to be executed, access control module 203 intercepts the launched request and applies access control rules dictated by control message 202 to determine whether such code is allowed to execute.

In one embodiment, access control module 203 converts control time 211 into an alert time 204. Such alert time 204 can be a specific clock time relative to a local computer time on access control module 203. Upon intercepting a request to execute a computer code, access control module 203 looks up time entries in memory table 205 to find whether such computer code has been previously time stamped. If so, access control module 203 compares alert time 204 with the time stamp of the computer code. If the computer code is time stamped prior to alert time 204, the computer code will be allowed to execute. Otherwise, the request to execute will be denied by access control module 203. The detail of the operation will be described below with reference to FIG. 4 and FIG. 5.

Access control module 203 is also capable of handling other control parameters in control message 202. If control message 202 specifies types of computer codes 213, access control module 203 makes a determination of executability of a computer code based on control parameter 213. If control message 202 dictates an access control rule based both on access control time 211 and the types of computer codes 213, access control module 203 combines these two control parameters to determine if a particular computer code is permitted to execute.

When access control message 202 contains expiration time 215, access control module 203 stores expiration time 215. If expiration time 215 is simply a time duration, e.g., "access control message will expire in 5 days," access control module 203 converts it into a specific clock time relative to its own clock time. When it reaches such clock time, access control module 203 ceases applying corresponding access control message 202 according to the specified time 215.

In alternative embodiments, besides performing access control functions as commanded by access control message 202, access control module 203 may also perform other functions to protect computer network 1. For example, if access control module 203 is installed on an E-mail gateway server 3 of computer network 1, it performs E-mail filtering functions for computer network 1. When access control system 200 enters into an alert mode warning of an imminent virus attack, access control module 203 automatically filters all incoming E-mails for executable file attachments, such as .EXE, .VBS, .JS files. The result of the filtering is to allow the E-mail bodies to be forwarded to recipients 2, 3 but to strip all executable attachments from the E-mails. For example, all the embedded Java script or VBS script code encoded in HTML mail bodies are automatically removed; and all the macros from incoming documents, spreadsheets, and PowerPoint presentation files are also removed.

One of the benefits of filtering the executable attachments of E-mails is to lessen the burden of virus detection tasks that are subsequently performed by each computer 2, 3. The initial filtering by such access control module 203 on a network E-mail server 3 substantially reduces the opportunities of computer viruses entering the network 1 after access control system 200 is activated.

Memory table 205 stores data and information related to all executable computer code in computers 2, 3. The stored data and information are used to decide if the executable computer code is allowed to execute at a virus alert mode. In one embodiment, memory table 205 stores hash values of computer codes that have been executed and a time entry recording the time of inserting the hash value into memory table 205. As will be described below, the time entry in memory table 205 is used to prevent execution of computer viruses even though conventional techniques are not able to detect them.

During the operation of access control system 200, memory table 205 can reside as a persistent file in RAM or be located in cache at computers 2, 3 so that access control module 203 can access memory table 205 at any time. Memory table 205 can also be saved into a computer hard disk or other storage medium for archival purposes. The detail of formation of memory table 205 will be described below with reference to FIG. 3.

Virus processing module 207 uses conventional anti-virus techniques to prevent known or unknown viruses from infecting computers 2, 3. In one embodiment, virus processing module 207 uses up-to-date anti-virus technologies to detect, clean up the computer virus, and repair infected computer files on computers 2, 3. For example, virus processing module 207 can be Norton AntiVirus (NAV) software made by Symantec Corporation of Cupertino, Calif. Virus processing module 207 not only executes anti-virus tasks when no computer virus outbreak occurs, but also cooperates with access control module 203 to build up memory table 205, and to prevent execution of susceptible or suspicious computer code during a computer virus outbreak. The detail of the operation will be described below with reference to FIGS. 4 and 5.

Note that although virus processing module 207 resides in anti-virus module 209 together with access control module 203 and memory table 205 in FIG. 2A, the present invention does not require so in alternative embodiments. Virus processing module 207 may be a separate module from access control system 200. In other words, access control system 200 itself does not necessarily include a virus processing module 207 to accomplish access control tasks. All anti-virus related tasks may be performed by independent anti-virus software, implemented as virus processing module 207. By doing so, the three functionality modules, access control console 201, access control module 203 and memory table 205 can be collectively implemented as an access control unit 290 to determine whether computer codes are allowed to execute or not. Access control unit 290 may be conveniently added to current anti-virus software on the market to provide all access control functions described herein for network 1.

It should also be understood that the server-client architecture illustrated in FIG. 1 does not limit the present invention to server-client network architecture or to a local area network. Access control system 200 is equally applicable to other types of networks such as peer-to-peer networks. In a peer-to-peer networking environment, any networked computer can be configured to operate access control console 201, and anti-virus module 209 is installed on other computers. Thus, a user or a system administrator activates access control system 200 from access control console 201 to prevent computer viruses from infecting the networked computers 2, 3.

Likewise, even in a server-client architecture, the present invention does not require that the implementation of access control system 200 be done through a server 3 that manages computer network 1. In an alternative embodiment, access control console 201 is installed on a client computer 2. A system administrator or a user sends the access control status mode and access control time 211 through access control console 201 to other client computers 2 and to server 3 to activate access control system 200.

Additionally, while in the present embodiment, the access control message 202 is transmitted from access control console 201 on a local network 1, in an alternate embodiment the message is transmitted from a remote service provider through the Internet or some other medium. The remote service provider can be a manufacturer of the computer 2, an operating system manufacturer, or any other entity responsible for providing service updates to the computer 2. The computer 2 can be configured to periodically connect to the service provider to check for new access control messages 202.

Furthermore, access control system 200 is equally applicable to a single computer environment, although the present invention has distinct advantages to safeguard a computer network 1 from computer virus attacks. For example, the method provided herein enables a home user to use his or her computer to browse the Internet or receive E-mails during a virus outbreak without disconnecting from the Internet.

Figure 2C:
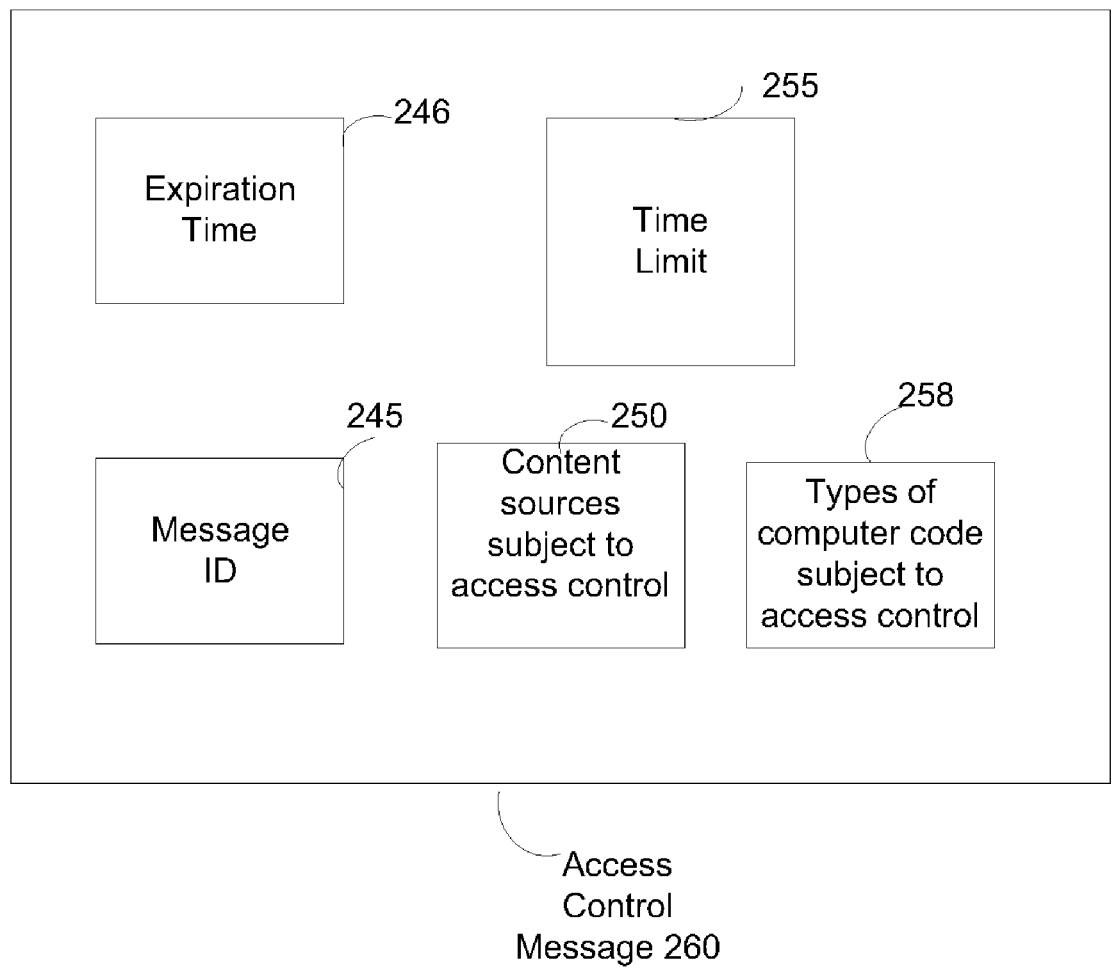
FIG. 2C is block diagram of an alternate embodiment of an access control message 260.

FIG. 2C is block diagram of an alternate embodiment of an access control message 260. This alternate embodiment can be transmitted by the access control console 201 as a routine virus prevention technique, rather than as a response to a particular virus outbreak. Rather than aligning itself to a fixed time point, the access control message 260 directs the access control module 203 to manage the execution of files within a fixed time period after the files are introduced to the client computer 2. Control message 260 includes five control parameters, an expiration time 246, types of computer codes that should be subject to access control 258, a message ID 245, content sources that should be subject to control 250, and a time limit 255.

While in the present embodiment, the access control message 260 is transmitted from access control console 201 on a local network 1, in an alternate embodiment the message is transmitted from a remote service provider through the Internet or some other medium. The remote service provider can be a manufacturer of the computer 2, an operating system manufacturer, or any other entity responsible for providing service updates to the computer 2. The computer 2 can be configured to periodically connect to the service provider to check for new access control messages 260.

The message ID 245, expiration time 246, content sources 250, and code types 258 provide similar information to their like named elements in FIG. 2B. The time limit 255 indicates a time after computer content enters a computer system during which it will be subjected to a higher degree of access control. Access control module 203 receives the access control message 250 and institutes controls on the future execution of executable code.

When computer 2 attempts to execute computer code, access control module 203 intercepts the execution of the code, and analyzes the code with respect to the parameters of the control message 255. For example, when computer 2 attempts to execute test.exe, the access control module 203 determines whether the file has been on the computer 2 longer than the time limit 255 by determining a current time, and referring to an entry time stored in the memory table 205 in association with test.exe. The access control module 203 can block execution of the computer code if test.exe has been on the system 2 for less than the time included in the time limit 255.

Figure 3:
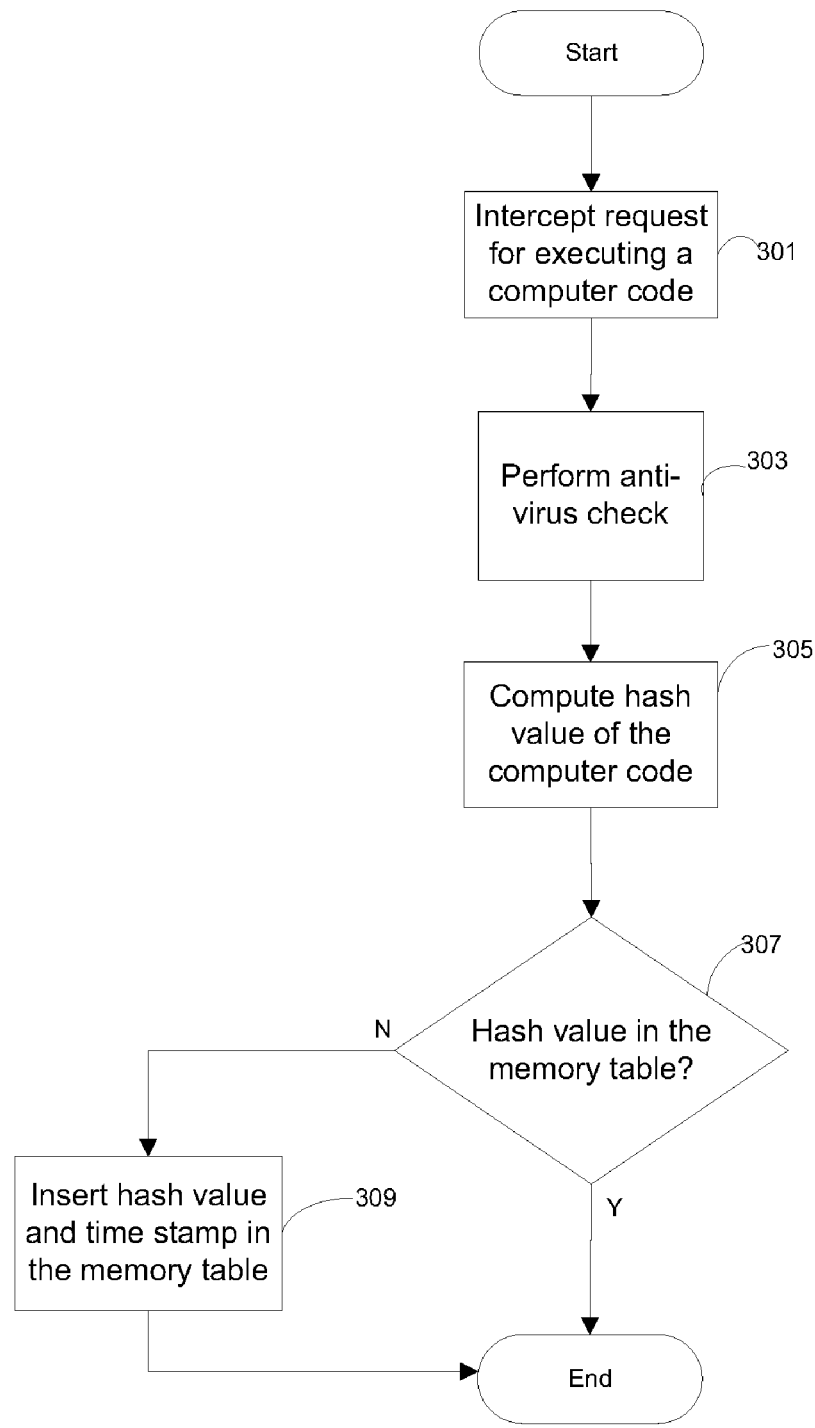
FIG. 3 is a flow diagram illustrating an embodiment of creating a memory table 205 for computer network virus access control.

FIG. 3 illustrates a methodology of generating memory table 205 for the purpose of access control in accordance with the present invention. Memory table 205 is created either when access control system 200 is in a safe mode, i.e., having not received any report of a computer virus outbreak, or when system 200 is in alert mode. Access control module 203 may be configured to control the process of generating memory table 205.

In one embodiment, memory table 205 contains two fields for each piece of executable computer code: a hash value and a time stamp.

The hash value ("hash") is a contraction of computer file contents created by applying a hash function to a given piece of computer code, e.g., .EXE, .COM, .VBS, .JS, individual macros in WORD documents or spreadsheets, etc. A hash function is a type of one-way function. The nature of a hash function is such that it is highly unlikely that two different files have the same hash value. One of ordinary skill in the art would recognize that there are a variety of hash functions that can be used. The hash functions may or may not be specifically tailored to the type of computer files.

Conventionally, certain anti-virus software stores the hash value in computer 2 for each program to speed up computer virus scanning process. Once a file is scanned, the hash of the contents of the file is stored in a database. During subsequent scans of the computer file, the hash of the computer file is first computed by the anti-virus software. If the computed hash matches the hash stored in the database, the file is certified clean by the anti-virus software without the necessity for a rescan. Such method is based on an assumption that the match of hash values shows with a high degree of certainty that the file has not been modified by another program, i.e., not infected by a computer virus.

In comparison, the present invention is not limited to using just hash functions and hash values to detect viruses. In one embodiment, memory table 205 has a field for storing a time stamp associated with the hash value. The time stamp indicates the time when the hash value is inserted into memory table 205. The time stamp provides useful information for the future determination of executability of computer code during a computer virus outbreak.

In one embodiment, during the safe mode system 200, when a computer code requests execution, access control module 203 intercepts (step 301) such request as a regular anti-virus program does. Access control module 203 then calls for virus scanning or other anti-virus check to determine whether this computer code is a possible virus (step 303), which may be performed by virus-processing module 207. If the computer code passes this test, access control module 203 computes (step 305) a hash value of the computer code. Access control module 203 further compares (step 307) the computed hash value with the stored hash value in memory table 205. If the same hash value is already in memory table 205, anti-virus module 209 will not block the execution of such computer code.

If the computed hash value is not in memory table 205, access control module 203 inserts (step 309) such hash value into memory table 205 with a time stamp specifying the time of insertion. For example, a time stamp "21:20:56, 07/13/2001", stored in binary form, shows that the hash of the computer code was inserted at a clock time of 21 hours 20 minutes 56 seconds on Jul. 13, 2001. By doing so, each computer code whose hash value has been stored in memory table 205 is certified clean.

Note that the above description of memory table 205 generation process occurs in the safe mode. In an alternative embodiment, the same method described in FIG. 3 is applicable to the alert mode. As will be further described with reference to FIG. 4, even in the alert mode, which corresponds to a heightened status of alert, access control module 203 is capable of time-stamping a computer code that passes a virus check but does not have its hash value stored in memory table 205. Such time-stamped computer code might not be allowed to execute eventually because of a certain access control rule. However, time-stamping the computer codes in alert mode will provide access control system 200 the capability to monitor all the status of executable codes throughout the virus break and thus possess a complete picture of all executable computer codes on computers 2, 3.

In addition, the above description of memory table 205 generation is not exhaustive of all the techniques to creating memory table 205. The entries of the hash value and time stamp in memory table 205 may also be encoded in a variety of manners. One embodiment of memory table 205 can be created using a scheme based on a LRU (Least-recently-used) algorithm.

Figure 4:
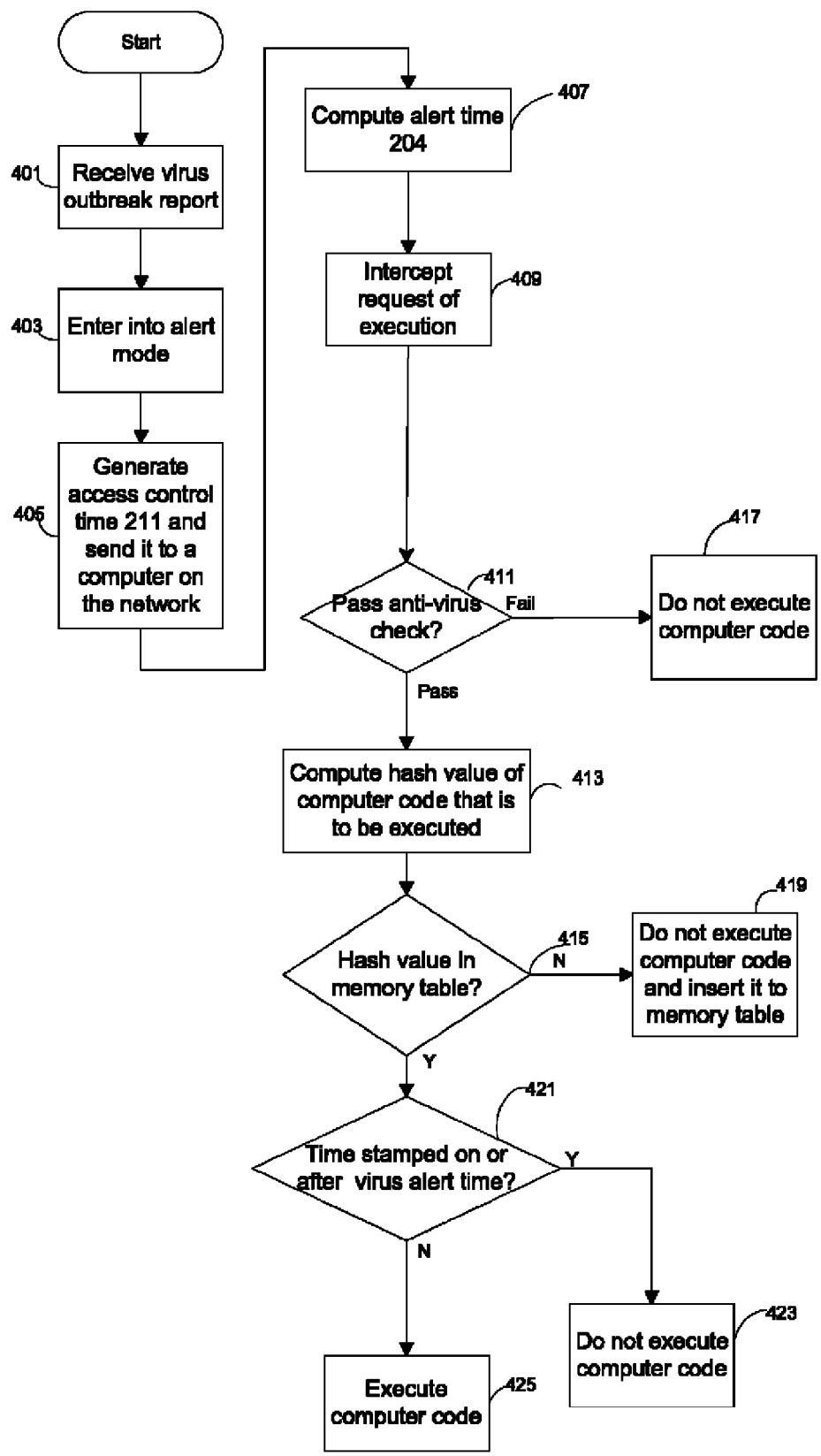
FIG. 4 is a flow diagram illustrating computer network access control for preventing computer virus infection using access control time 211.

FIG. 4 is a flow chart of a method for exercising access control for computer network 1 through the generation and processing of access control message 202. As described above, access control console 201 sends an access control message 202 to access control module 203 determining if computer codes should be executed on computers 2, 3. In one embodiment as illustrated below, the present invention may use just access control time 211 to perform the access control upon all types of executable computer codes. In other words, as a default rule, this embodiment may apply access control time 211 to all executable computers codes that are to be executed on computers 2, 3. It is unnecessary for the present invention to specify a parameter 213 in access control message 202 in order to accomplish the entire access control tasks.

Access control system 200 is activated upon receiving a computer virus outbreak report (step 401). We assume that computer network 1 has received the computer virus outbreak report from external sources. Such sources may include anti-virus software publishers, news media, Internet bulletin boards, etc. A typical virus outbreak report may include information such as:

When and where a new computer virus is first found;
In what ways the computer virus infects computers, e.g., what types of computer files are typically infected;
What kind of harm is caused by such virus;
Whether any current anti-virus software is capable of detecting and cleaning up computer network 1.

Based on the information in the virus outbreak report, a system administrator or a user of computer network 1 enters into an alert mode (step 403), which indicates that computer network 1 might be under an imminent computer virus attack or should be placed into a heightened status of alert. If system 200 has been placed in alert mode, the system administrator can just skip this step and proceed to send a new control message 202 to computers 2, 3. If the new virus has been identified and cleaned up by an anti-virus software publisher's updates, the system administrator can place system 200 back to a safe mode.

During a computer virus outbreak, before new virus identities are detected, the system administrator often tries to extract various information from the report and then makes a determination or accepts a recommendation as to when a possible virus attack might happen at the earliest time. Upon making a determination, the system administrator enters access control time 211 (step 405) and disseminates it in access control messages 202 to computers 2, 3 to prevent any computer codes that might have been infected or would be infected. In one embodiment, access control time 211 is a relative time stamp or a particular period during which network 1 should be scrutinized for new virus attacks. The system administrator may simply enter an access control time 211 as a period of time, e.g., 3 days, and roll it out to all access control modules 203 in a control message 202 read as "all computer codes that were time stamped within the past 3 days (time 211) should be blocked from executing." When an access control module 203 receives this access message and the corresponding control time 211 (3 days) at a local computer clock time (e.g., "19:00:00, Jun. 15, 2001"), access control module 203 can convert this control time 211 into an alert time 204, which is a specific point of time relating control time 211 to its 203 local computer clock time. In this example, since it is at "19:00:00, Jun. 15, 2001" that module 203 receives this control message 202, control module 203 will convert time 211 to alert time 204 "19:00:00, Jun. 12, 2001". As a result, access control module 203 now will perform access control on every request of executing codes and block execution of any computer codes which are time stamped on or after virus alert time "19:00:00, Jun. 12, 2001."

The method of using a relative time stamp or a specified time duration as access control time 211 and converting time 211 to alert time 204 is particularly advantageous for network 1 where computers 2, 3 might have different computer clock times. In many circumstances, there may be a time disparity among access control console 201 and each module 203 on computers 2, 3, i.e., a specific clock of time in control message 202 might correspond to totally different points of time in the eyes of console 201 and modules 203. In this situation, if access console 203 just defined a particular point of time relative to its own clock time and control module 203 replicated it, access control module 203 would fail to take into account the time disparity. Such time disparity may cause asynchronism between and among anti-virus modules 203 in reacting to an access control message 202.

As an example, we assume that when access control message 202 is sent from console 201 to a module 203, the local clock time of module 203 is 10 minutes behind the local clock time of access control console 201; and when access control module 203 receives an access control time 211 "21:00:00, Jun. 14, 2001" from console 201, access control module 203 uses the exact access control time 211 as alert time 204. Due to the time disparity, the time "21:00:00, Jun. 14, 2001" actually means different things to access control console 201 and access control module 203: a time of "21:00:00, Jun. 14, 2001" under access control console 201's clock time corresponds to "20:50:00, Jun. 14, 2001" under access control module 203's clock time. As understood above and described in detail below, the effect of alert time 204 is that access control module 203 will block execution of any computer code which is time stamped on or after alert time 204. Now because of the time disparity, if access control module 203 used "21:00:00, Jun. 14, 2001" as alert time 204, access control module 203 would fail to block computer code time stamped between "20:50:00, Jun. 14, 2001" and "21:00:00, Jun. 14, 2001." Thus, access control module 203 would entail a risk of potential virus infection and fail to provide protection as intended by access control console 201.

The above problem is overcome by letting the system administrator enter a relative time stamp or duration of access control as being access control time 211. Once access control module 203 receives such relative time stamp, alert time 204 will be computed based on the relative time stamp in control message 202 and the respective local clock time. By doing so, access control console 201 successfully synchronizes each computer 2, 3 to execute a same access control rule despite the time disparity among computers 2, 3.

In an alternative embodiment, if network 1 successfully solves the time disparity problem or access control system 200 is operating on just a single computer, the system administrator or a user of the computer 2, 3 can use just a clock time as being access control time 211 in message 202, since the concern of time disparity does not exist in both situations. By way of an example, the system administrator or the user of the computer may use the computer's clock time specifying the moment of entering into alert mode as access control time

211. Upon receiving the access control time 211, access control module will use access control time 211 as alert time 204 to determine the executability of a computer code.

Still referring to FIG. 4, after access control module 202 converts control time 211 into alert time 204 at step 407, access control module 202 monitors all the requests to execute any computer code on the computer 2, 3. When a computer code is to be executed, access control module 203 intercepts the request (step 409) and applies anti-virus detection techniques to determine whether the computer code is a virus or not (step 411). If the computer code is determined to be a virus, the computer code is not executed (step 417). Virus-processing module 207 will use its anti-virus tools to remove the computer code or quarantine the virus-infected computer files.

If the computer code is not determined as a virus at step 411, access control module 203 applies alert time 204 to determine the executability of the computer code. At step 413, access control module 203 computes or instructs virus processing module 207 to compute a hash value of the computer code. The hash function used to compute the hash value is preferably the same as what has been used for generating hash values in memory table 205. In this way, a same and unchanged computer code will correspond to a same unique hash value. Then access control module 203 checks (step 415) to see if there is a same hash value entry in memory table 205 as the newly computed hash value. If the computed hash value does not appear in memory table 205, access control module 203 assumes the computer code requesting execution has never been allowed to execute. Access control module 203 thus refuses (step 419) execution of the computer code since such computer code is "an unknown program" that possibly contains a computer virus or has been infected with a computer virus. Here, comparing the hash value of the computer code with stored entries in memory table 205 becomes another virus detection measure in addition to anti-virus procedure at step 411. It further reduces the opportunities of virus infecting with computers 2, 3 of network 1.

Note that the above assumption that the mismatch of hash value indicates that the computer code has not been executed has its limitations in certain circumstances. During virus outbreak, the system administrator may be able to receive virus definition or new updates from anti-virus software publishers to clean up all the files on network 1. In this process, some repaired computer programs or files may be changed and thus their hash values will be different from the original hash value even though they are not "unknown programs" at all. These repaired programs or files should have been allowed to execute upon passing the remaining access control steps 421-425 at the alert mode.

To solve this problem, an alternative embodiment of the present invention configures virus-processing module 207 to place a flag to certify a program as clean if the program has been repaired by the most current anti-virus update. Thus, when access control module 203 computes its hash value at step 415, module 203 will immediately recognize that such flagged program should be allowed to execute or proceed to the next access control step. In other words, control module 203 will not block the execution of this particular program in spite of a mismatch of the hash values.

If the hash value of the computer code is found in memory table 205, access control module 203 further compares (step 421) the time stamp entry associated with this hash value with alert time 204. As described above, access control module 203 time-stamps computer codes whose hash values have been inserted in memory table 205. The time entry in memory table 205 corresponds to a most recent moment of inserting the hash value of the computer code into memory table 205. According to one embodiment of the present invention, if the hash value was inserted into memory table 205 at the same time as or subsequent to alert time 204, access control system 200 assumes that the computer code represented by the hash value is an unknown program (and possibly containing a virus) and thus denies execution of the computer code (step 423). If the computer code is time stamped prior to alert time 204, access control system 200 regards the code as safe and allows (step 425) the code to be executed.

Note that although a computer code is denied execution, access control module 203 may still insert its hash value and associated time stamp to memory table 205. As described above in FIG. 3, memory table 205 is capable of time stamping computer codes during alert mode. Such time stamp can be used to determine execution of the same computer code in subsequent stages of the virus outbreak. For example, as more information is received from anti-virus software publishers regarding the new virus, a system administrator might send another control message 202 to downgrade the access control to a less stringent level by using a new access control time 211, e.g., from "all computer codes that were time-stamped during past 5 days should be blocked" to "all computer codes that were time-stamped during past 2 days should be blocked". Under this new access control level, the computer code that was previously denied permission to execute may be allowed to execute if it is now determined to be time-stamped prior to new access control time 211 (2 days). As a result, this allows more "innocent" computer programs and applications to be available for users even at a heightened status of alert.

While in the present embodiment, the access control module 203 blocks the execution of code that is suspicious by virtue of its entry time, in alternate embodiments, the access control module 203 institutes less stringent restrictions. For example, in one embodiment, the access control module 203, rather than blocking the execution of the computer code in steps 417, 419, and 423, allows the code to execute, but restricts it from performing certain actions, such as creating new files or opening network connections.

Figure 5A:
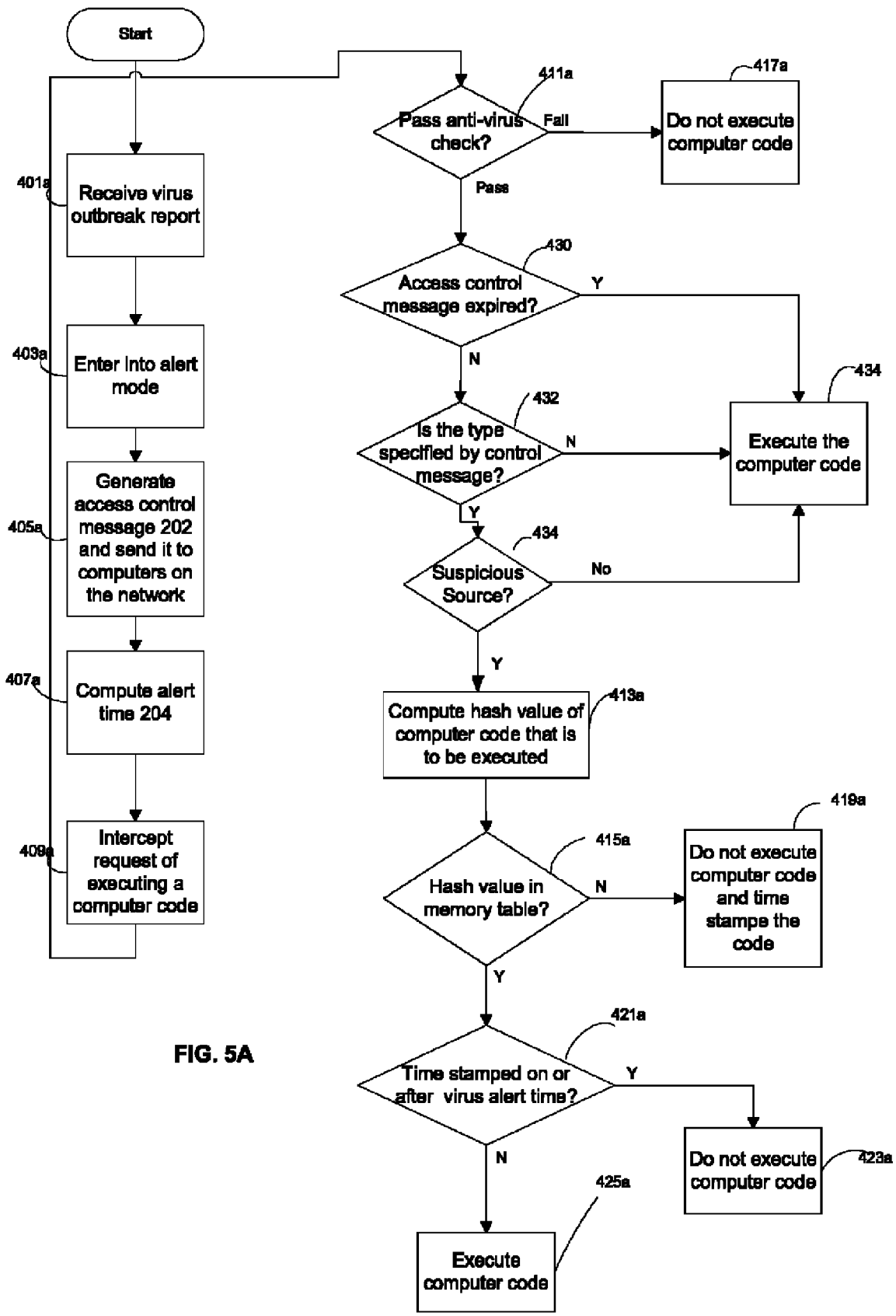
FIG. 5A is a flow diagram illustrating computer network access control using multiple control parameters in access control message 202.

FIG. 5A is a flow chart illustrating a method using access control time 211 and other control parameters in control message 202 to exercise the access control. Similar to steps 401-409 in FIG. 4, the system administrator receives a virus outbreak report (step 401a), enters into alert mode (step 403a) and then generates access control message 202 and sends it to computers 2, 3 (step 405a). In this embodiment, access control message 202 includes control parameters such as control time 211, types of computer codes 213, sources of computer code 212, and expiration time 215. Access control module 203 receives access control message 202, computes alert time 204 based on control time 211 (step 407a), and intercepts a request to execute a computer code (step 409a). If such computer code is or contains a virus, it will not be executed (step 417a). For those computer codes that pass the anti-virus test, access control module 203 will proceed to determine if the current access control message 202 has expired (step 430). As described above, access control expiration time 215 specifies when a particular access control message 202 stops being effective. As a counterpart of access control time 211, access control expiration time 215 may also be a relative time stamp or duration of time entered by the system administrator. When access control module 203 receives expiration time 215 along with other parameters in access control message 202, module 203 determines what is the exact point of time the received control message 202 shall become ineffective. For example, assuming that expiration time 215 is "10 days" and the local clock time of access control module 203 is "19:00:00, Jun. 15, 2001" when receiving message 202, access control module 203 will thus decide that this control message 202 should no longer be controlling at "19:00:00, Jun. 25, 2001". The benefit to use such an expiration time 215 is that the system administrator does not need to monitor the status of a control message 202 that he or she previously sent out. This is particularly useful when system 200 does not automatically revoke a prior control message 202 by sending a subsequent control message 202.

If access control message 202 has not expired, access control module 203 uses the types of computer codes 213 to determine if the requesting computer code should be subject to access control (step 432). If the computer code does not belong to the specified types or categories of computer codes 213, access control module 203 will not block the execution of such computer code.

If the computer code is one of the types of programs or application as specified in parameter 213, access control module 203 references memory table 205 to determine whether the computer code originated from a source indicated in control message 202 (step 434). If the code did not originate from a source indicated in control message 202, the code is executed (step 417). If the code originates from a source specified in parameter 212, access control module 203 proceeds to find out whether the computer code is time stamped before alert time 204 or not. Access control module 203 directs virus-processing module 207 to determine if such computer code contains a virus (step 411a). The remaining steps 413a-425a are identical or substantially similar to what has been described in FIG. 4.

The method illustrated in FIG. 5A provides access control system 200 more flexibility and new granularity of access control levels. As noted above, the system administrator may flexibly combine different configurations of control parameters to adapt to different stages during an ongoing virus break. For example, at an early stage, the system administrator might have to command all computer codes that were time-stamped after a certain point of time to be blocked. Once the types of new virus are later determined to infect only macros, the system administrator can roll out a new message 202 with a changed parameter 213 to allow execution of all computer files except macros. After access control module 203 receives this new message 202, it will no longer block the execution of programs like .EXE or .COM even if they are time-stamped after alert time 204. Therefore, such access control method substantially benefits network 1 by letting users have access to computer programs and applications at a maximum extent while ensuring the safety of network 1 during a heightened status of alert.

Figure 5B:
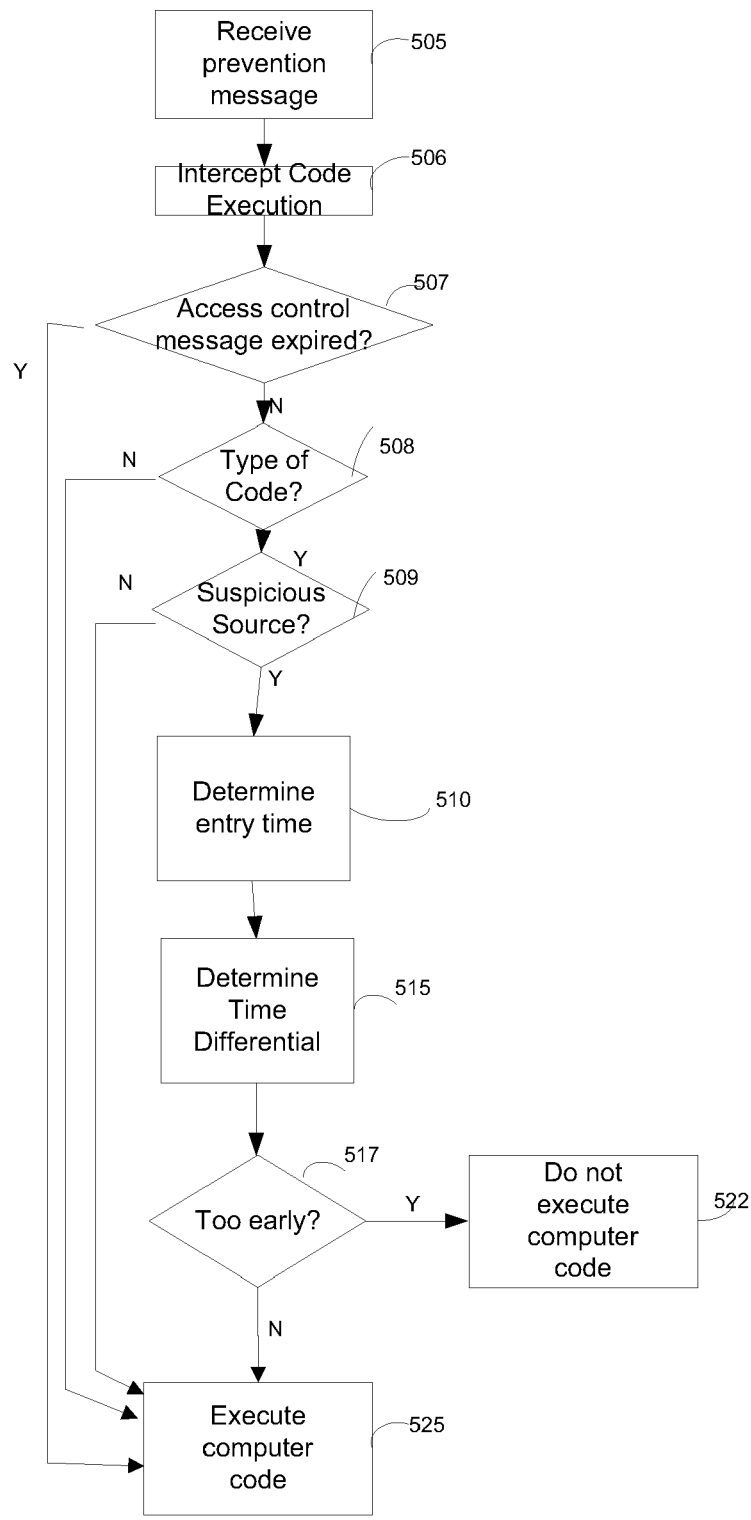
FIG. 5B is a flow chart illustrating computer network access control using multiple control parameters in access control message 260.

FIG. 5B is a flow chart illustrating computer network access control using multiple control parameters in access control message 260. The process begins with the access control module 203 receiving an access control message 260 (step 505). This message can be sent in response to a particular virus outbreak or as routine preventative measure. In one embodiment, the access control message 260 includes a list of content sources to be scrutinized 250, an identifier, an expiration time 246, a list of computer code types subject to access control 258, and a time limit 255. The access control module 203 intercepts an attempt to execute computer code (step 506). The access control module 203 then determines whether the access control message 260 has expired (step 507). If the access control message 260 has expired, the computer code is permitted to execute (step 525). If the access control message 260 has not expired 260, the access control module 203 then determines whether the computer code is a type of code which is subject to access control (step 508). If the computer code is not a type of code subject to access control, the computer code is permitted to execute (step 525). If the computer code is a type of code subject to access control, the access control module 203 then determines whether the computer code comes from a source listed in the list of content sources 250 (step 509). If the computer code did not originate from one of the listed sources 250, the computer code is permitted to execute (step 525). If the computer code originated from one of the listed sources 250, the access control module 203 then determines an entry time for the computer code (510). In one embodiment, computer code is time stamped upon first execution. The time stamp is stored in association with the code in memory table 205. In this embodiment, the access control module 203 uses the time stamp to determine an entry time. The access control module 203 then references a current time to calculate a time differential (step 515). The access control module 203 then determines whether the computer code has been on the computer system 2 less time then the amount specified in the time limit 255 of in the access control message 260 (step 517). If the computer code has been on the system 2 less time than the time limit, the code is not permitted to execute (522).

While in the present embodiment, the access control module 203 blocks the execution of code in step 522, in alternate embodiments, the access control module 203 institutes less stringent restrictions. For example, in one embodiment, the access control module 203 allows the code to execute, but restricts it from performing certain actions, such as creating new files or opening network connections.

If the computer code has been on the computer 2 longer than the time amount specified in the time limit, the compute code is permitted to execute (step 525). In one embodiment, computer code that has been on the computer 2 exactly as long as the time limit is subjected to access controls.

Figure 6:
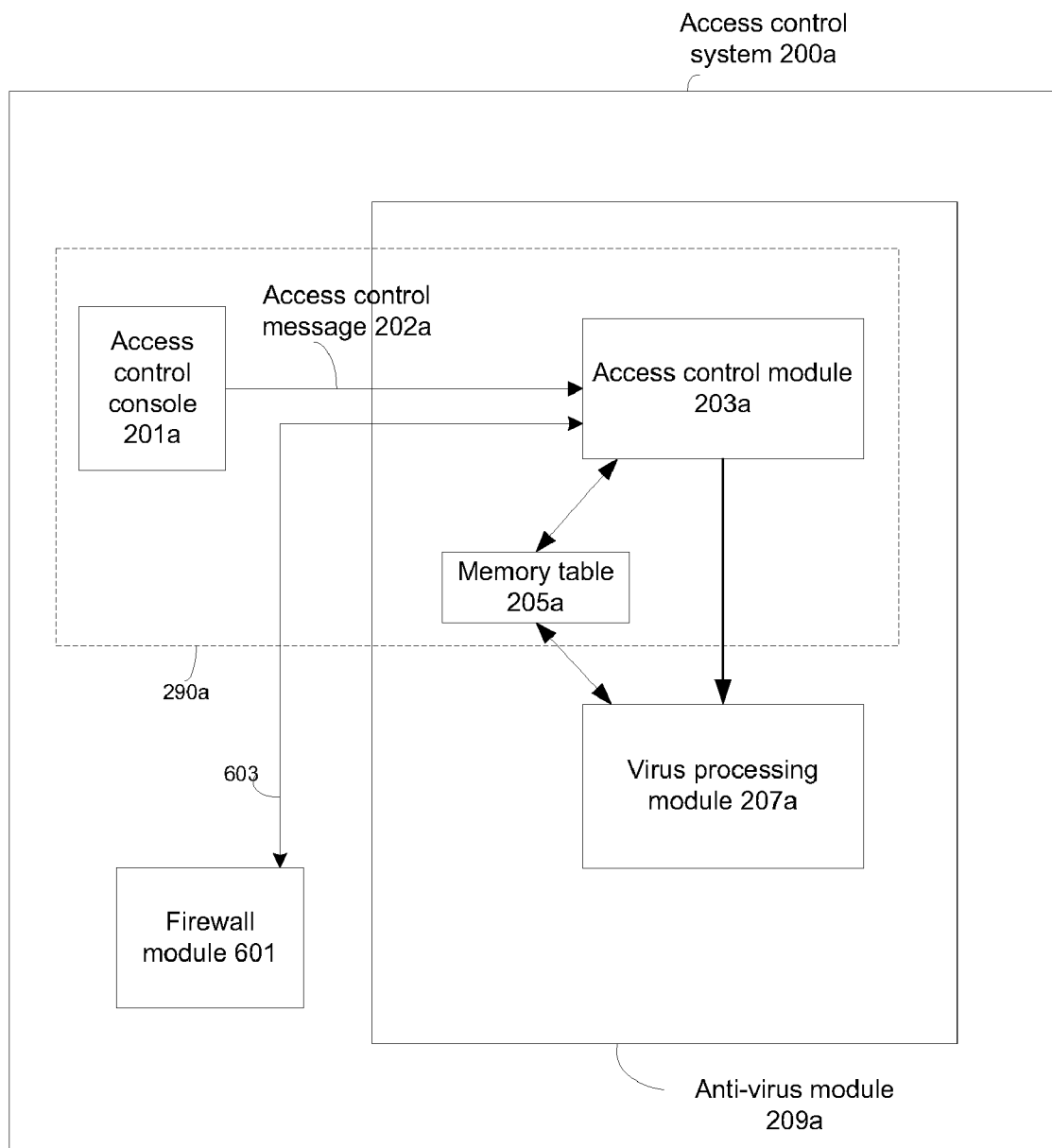
FIG. 6 is a block diagram illustrating an embodiment of access control system 200a to apply access control on data communications with external network 4.

FIG. 6 is a block diagram illustrating another embodiment of access control system 200a of the present invention. For ease of description, components 201a-209a correspond to components 201-209 in system 200, respectively, and each of the components is capable of performing the same functions as described above. Besides these, access control system 200a may include a firewall module 601. Firewall module 601 may reside in one of computers 2, 3 of network 1. Alternatively, firewall module 601 may be a separate entity coupled to computers 2, 3. Access control module 203a is coupled to firewall module 601 via connection 603. This alternative embodiment of system 200a may also be installed on just one single computer 2, 3, which connects to outside network 4 through firewall module 601.

Typically, firewall module 601 is a component of the gateway of network 1 that connects to external network 4. Firewall module 601 is designed to control of what kind of data can be received by and sent from network 1. For example, firewall module 601 can refuse the entry of any inflow data that is not initiated by any applications or programs running on computers 2, 3. In this way, firewall module 601 prevents any malicious codes from entering network 1. Firewall module 601 can be implemented as software, hardware and/or firmware in a variety of means. A typical firewall software product is Norton Personal Firewall by Symantec Corporation.

Access control system 200a as illustrated herein is not only capable of blocking the execution of susceptible or suspicious computer codes, but is also capable of blocking any susceptible or suspicious data communications between network 1 and external network 4 during the alert mode.

In reality, it is possible that computers 2, 3 have been infected with a virus before system 200a is placed into alert mode. The undetected virus might have been activated and is causing harm to network 1. It is therefore important to react promptly to limit such damage to a minimum. For example, a new Trojan horse virus may have already been running on a computer 2 and is exporting confidential information on computer 2 to an unauthorized computer user on external network 4 without any knowledge of current anti-virus software 207 on network 1. Such harmful data transfer passes through firewall module 601, but in many circumstances firewall module 601 does not block the data transfer unless it is told to do so.

To effectively cut off such unauthorized and harmful data communications, access control system 200a applies access control rules to firewall module 601. As will be described in detail below, firewall module 601 will deliver a request to access control module 203a to determine whether a particular data communication now passing the network gateway should be blocked. Access control module 203a will make the determination based on access control time 211a received from access control console 201a.

Figure 7:
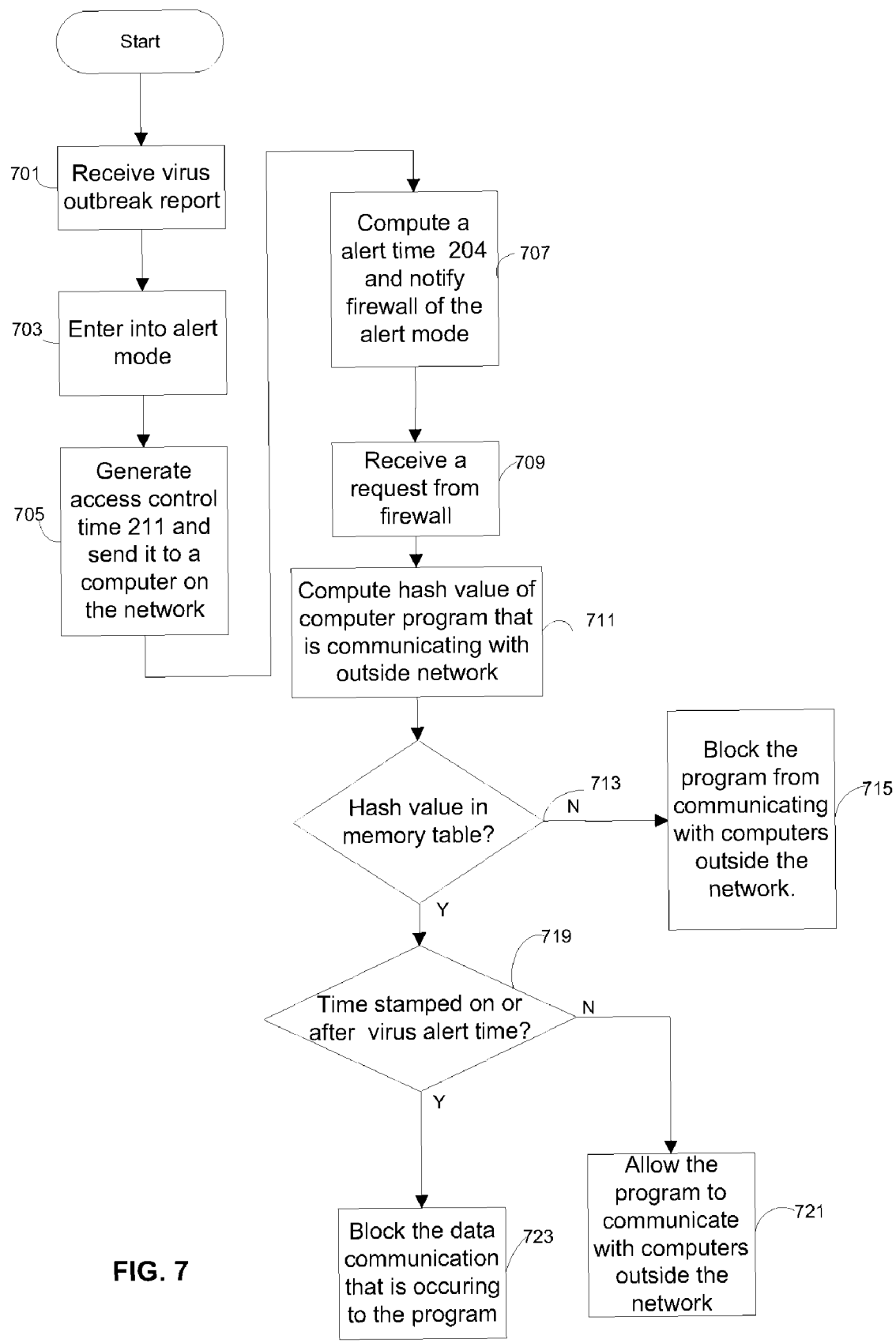
FIG. 7 is a flow diagram illustrating a method of applying access control on data communications with external network 4.

FIG. 7 is a flow chart illustrating a method of exercising access control on data communication passing through firewall module 601. The system administrator of network 1 receives (step 701) a virus outbreak report, and then activates (step 703) virus outbreak alert mode. Similar to what has been described above, at the time of entering the alert mode, the system administrator composes (step 705) access control message 202 through console 201a, including access control time 211, to dictate a specific access control rule. For the purpose of controlling firewall 601, one exemplary control message 202 may be read as "all data communications that are occurring between external network 4 and a program on network 1 should be blocked if the program is time stamped on or after a time as determined by access control module 203a on account of access control time 211." Note that control message 202 for firewall module 601 is not necessarily identical to that used for access control described with reference to FIGS. 2, 4 and 5. The system administrator or the users of computers 2, 3 may configure separate control messages 202 for blocking execution of computer codes and blocking data communications passing through firewall module 601.

Access control module 203a receives (step 707) access control message 202 from console 201a and notifies firewall module 601 that network 1 is now under the alert mode. Upon entering the heightened status of alert, firewall module 601 may suspend any current data communications between programs or applications running on computers 2, 3 and external network 4. Simultaneously, for each program and application that is communicating or attempting to do so, firewall module 601 will send a request back to access control module 203a of each computer 2, 3 that hosts such programs and applications. In particular, firewall module 601 will ask access control module 203a whether such data communication should be permitted. Such request may include information such as the identification information of the programs or applications.

In response to receiving 709 the request from firewall module 601, access control module 203a will apply access control rules in access control message 202 to determine whether the data communication that is occurring to the particular program or application is suspicious. As shown in FIG. 7, the remaining steps are similar to what has been described in FIGS. 4 and 5. Access control module 203a computes (step 711) the hash value of the program and then looks up (step 713) the hash value in memory table 205a. If the hash value is not located at memory table 205a, access control module 203a will generate a message and send it back to firewall module 601 dictating that the program is "unknown" and thus its data communication might be harmful. Firewall module 601 can therefore 715 block such data communication.

If the hash value is found at memory table 205a, access control module 203a retrieves the time stamp associated with the program, which is now represented by the hash value. Access control module 203a then compares 719 the time stamp with alert time 204. As understood above, if such program is time stamped before the moment as indicated by alert time 204a, access control module 203a deems such program as being safe and then returns a permission message to firewall module 601. Firewall module 601 therefore will not block 721 the data communication, or will resume the data communication that has been suspended.

If the program is time stamped on or after alert time 204a, control module 203a will return 723 a message to firewall module 601 to discontinue the data communication or refuse the attempt to transfer data into or out of network 1. By doing so, access control module 203a successfully works together with firewall module 601 to monitor cross-network data communications in the alert mode.

One advantage of the embodiment of access control system 200a is that it expands access control capability to firewall components such that the firewall module 601 can be used effectively to block or to interfere with any harmful data transfers during a virus outbreak. This can substantially limit any potential damage caused by viruses. Also the access control greatly reduces intrusiveness to normal program operation in the alert mode. For example, an uninfected video conferencing program may still be allowed to operate during high alert mode.

In view of the foregoing discussion, the present invention provides a high level of protection with a low level of intrusiveness. In one aspect, all the previously installed executable computer code such as programs, scripts, or macros, will not be prevented from running if they are time stamped prior to the appropriate alert time 204. Only new applications and programs are blocked from execution. As described above, such limitations will become minimal once anti-virus software publishers provide new definitions for the new viruses and a less stringent access control status mode is activated. In another aspect, even if computers 2, 3 have been infected, the access control systems and the methods provided herein are capable of reducing the potential damage to a minimum.

The above description is included to illustrate the operation of several embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A system for preventing infection of a host system by a virus, the system comprising:
   a memory module configured to store a time stamp indicating a time at which a computer code was introduced to the host system;
   an access control module coupled to the memory module and comprising instructions that, when executed by a computer processor:
   receive an access control message including an access control time, wherein the access control time is expressed as a duration of time; and
   prevent execution of the computer code on the host system responsive to the time stamp indicating a time within the duration of time expressed by the access control time; and a computer processor configured to execute the instructions of the access control module.

2. The system of claim 1, wherein the access control message further includes sources of computer code; and
the instructions, when executed by the computer processor, further prevent execution of the computer code responsive to the computer code originating from a source of computer code included in the access control message.

3. The system of claim 1, wherein
the access control message further includes an expiration time; and
the instructions, when executed by the computer processor, further permit execution of the computer code responsive to the expiration time indicating that the access control message has expired.

4. The system of claim 1, wherein the instructions, when executed by the computer processor, further intercept an attempt to execute the computer code.

5. The system of claim 1, wherein the time at which the computer code was introduced to the host system is a time at which the computer code was first introduced to the host system.

6. The system of claim 1, wherein the access control time is a fixed time period measured from when the computer code is introduced to the host system during which the instructions, when executed by the computer processor, prevent execution of the computer code.

7. The system of claim 1, wherein the access control time represents an estimate of when a virus attack first began.

8. A method for preventing infection of a host system by a virus, comprising:
storing a time stamp indicating a time at which a computer code was introduced to the host system;
receiving an access control message including an access control time, wherein the access control time is expressed as a duration of time; and
preventing execution of the computer code on the host system when the time stamp indicates a time within the duration of time expressed by the access control time.

9. The method of claim 8, further comprising:
receiving a list of sources;
determining a source of the computer code; and
preventing execution of the computer code on the host system when the source of the computer code is listed in the list of sources.

10. The method of claim 8, further comprising:
receiving a list of types of computer code;
determining a type of the computer code; and
preventing execution of the computer code on the host system when the type of the computer code is listed in the list of types of computer code.

11. The method of claim 8, wherein the access control message further includes sources of computer code, and further comprising:
preventing execution of the computer code when the computer code originated from a source of computer code included in the access control message.

12. The method of claim 8, wherein the access control message further includes an expiration time, and further comprising:
permitting execution of the computer code when the expiration time indicates the access control message has expired.

13. A non-transitory computer readable storage medium storing a computer program executable by a processor for preventing infection of a host system by a virus, the actions of the computer program comprising:
storing a time stamp indicating a time at which a computer code was introduced to the host system;
receiving an access control message including an access control time, wherein the access control time is expressed as a duration of time; and
preventing execution of the computer code on the host system when the time stamp indicates a time within the duration of time expressed by the access control time.

14. The computer readable storage medium of claim 13, further comprising:
receiving a list of sources;
determining a source of the computer code; and
preventing execution of the computer code on the host system when the source of the computer code is listed in the list of sources.

15. The computer readable storage medium of claim 13, further comprising:
receiving a list of types of computer code;
determining a type of the computer code; and
preventing execution of the computer code on the host system when the type of the computer code is listed in the list of types of computer code.

16. The computer readable storage medium of claim 13, wherein the access control message further includes sources of computer code, and further comprising:
preventing execution of the computer code when the computer code originated from a source of computer code included in the access control message.

17. The computer readable storage medium of claim 13, wherein the access control message further includes an expiration time, and further comprising:
permitting execution of the computer code when the expiration time indicates the access control message has expired.

18. The system of claim 1, wherein the access control message is created by, and received from, a system administrator.

19. The system of claim 1, wherein:
the memory module stores a first time stamp indicating a first time at which a first computer code was introduced to the host system, and a second time stamp indicating a second time at which a second computer code was introduced to the host system, the first time being within the duration of time expressed by the access control time, and the second time being outside the duration of time expressed by the access control time; and
the instructions when executed by the computer processor prevent execution of the first computer code on the host system responsive to the first time stamp and allow execution of the second computer code on the host system responsive to the second time stamp.

20. The system of claim 1, wherein the time at which the computer code was introduced to the host system is a time at which the computer code entered the host system.

* * * * *